United States Patent
Yasui et al.

(10) Patent No.: US 7,715,963 B2
(45) Date of Patent: May 11, 2010

(54) STABILIZER CONTROL APPARATUS

(75) Inventors: Yoshiyuki Yasui, Nagoya (JP); Shingo Urababa, Toyota (JP); Shuuichi Buma, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 715 days.

(21) Appl. No.: 11/066,197

(22) Filed: Feb. 25, 2005

(65) Prior Publication Data

US 2005/0192728 A1  Sep. 1, 2005

(30) Foreign Application Priority Data

Feb. 26, 2004  (JP)  ............... 2004-051296

(51) Int. Cl.
  *B60G 21/00*  (2006.01)
  *G06F 17/00*  (2006.01)
  *G06F 19/00*  (2006.01)

(52) U.S. Cl. ............... 701/38; 701/36; 701/37; 701/39; 701/40; 701/41; 280/5.502; 280/5.506; 280/5.507; 280/5.508; 280/5.509; 280/5.51; 280/5.511; 280/5.512; 280/124.106

(58) Field of Classification Search ............ 701/36–41; 280/5.502, 5.506–5.512, 124.106
See application file for complete search history.

(56) References Cited

U.S. PATENT DOCUMENTS 4,897,776 A * 1/1990 Urababa et al. ............... 701/38
5,144,558 A * 9/1992 Fukushima et al. ........... 701/38
5,173,857 A * 12/1992 Okuyama et al. ............. 701/37
5,384,705 A * 1/1995 Inagaki et al. ................ 701/38
5,519,611 A * 5/1996 Tagawa et al. ................ 701/37
6,175,792 B1 * 1/2001 Jones et al. ................... 701/37
6,354,607 B1   3/2002 Kawashima et al.

FOREIGN PATENT DOCUMENTS

| | | |
|---|---|---|
| EP | 0 933 239 A1 | 8/1999 |
| JP | 9-20223 | 1/1997 |
| JP | 9-193776 | 7/1997 |
| JP | 2000-71739 | 3/2000 |
| JP | 2001-63544 | 3/2001 |
| WO | 02/053398 A1 | 7/2002 |

* cited by examiner

*Primary Examiner*—Jack W. Keith
*Assistant Examiner*—Chuong P Nguyen
(74) *Attorney, Agent, or Firm*—Bushanan Ingersoll & Rooney PC (57) ABSTRACT

In a stabilizer control apparatus for controlling a torsional rigidity of a stabilizer of a vehicle, an actual lateral acceleration and a calculated lateral acceleration are obtained. Then, influence amount caused by the calculated lateral acceleration is set to be greater than influence amount caused by the actual lateral acceleration, when the vehicle is moving straight, whereas the influence amount caused by the actual lateral acceleration is set to be increased, with the turning operation of the vehicle being increased, to actively control the rolling motion of the vehicle body.

9 Claims, 13 Drawing Sheets

STABILIZER CONTROL APPARATUS

This application claims priority under 35 U.S.C. Sec. 119 to No. 2004-051296 filed in Japan on Feb. 26, 2004, the entire content of which is herein incorporated by reference.

BACKGROUND OF THE INVENTION

1. Field of the Invention

The present invention relates to a stabilizer control apparatus for a vehicle, and more particularly to an apparatus for controlling a torsional rigidity of a stabilizer disposed between a right wheel and a left wheel.

2. Description of the Related Arts

In general, a stabilizer control apparatus for a vehicle is provided for applying an appropriate roll moment to a vehicle by means of a stabilizer, while the vehicle is performing a turning operation, to reduce or restrict a rolling motion of the vehicle body. In order to achieve this function, Japanese Patent Laid-open Publication No. 2000-71739, for example, discloses an apparatus for controlling efficiency of a stabilizer to vary an apparent torsional rigidity of the stabilizer by driving and controlling an actuator in response to output of means for detecting a turning level of a vehicle, e.g., a lateral acceleration sensor. According to that apparatus, the actuator is actuated to control a varying position of the vehicle, so as to provide a property attaching importance to ride comfort in a range of relatively small turning operation, and it is actuated to control the varying position of the vehicle, so as to provide a property attaching importance to stability, with an inherent rigidity of the stabilizer produced by limiting the movement of the actuator with a small movable range, when the turning operation is increased.

In Japanese Patent Laid-open Publication No. 9-20223, there is disclosed a method for determining a rough road, by calculating a wheel acceleration on the basis of a wheel speed, and obtaining its high-frequency component through a high-pass filter, to calculate a dispersion of the wheel acceleration, on the basis of which the rough road is determined. Also, Japanese Patent Laid-open Publication No. 2001-63544 discloses a method for determining a rough road according to a result of F-study through a dispersion of differentiated value of output from an acceleration sensor obtained when a vehicle is running on a reference flat road surface at a small steering angle, and a dispersion of differentiated value of output from the acceleration sensor obtained when the vehicle is running on the present road surface at the small steering angle. Furthermore, in Japanese Patent Laid-open Publication No. 9-193776, as to factors for use in a vehicle stability control, there are disclosed spinning value indicative of spinning state variable and drift-out value indicative of drift-out state variable.

Figure 5:
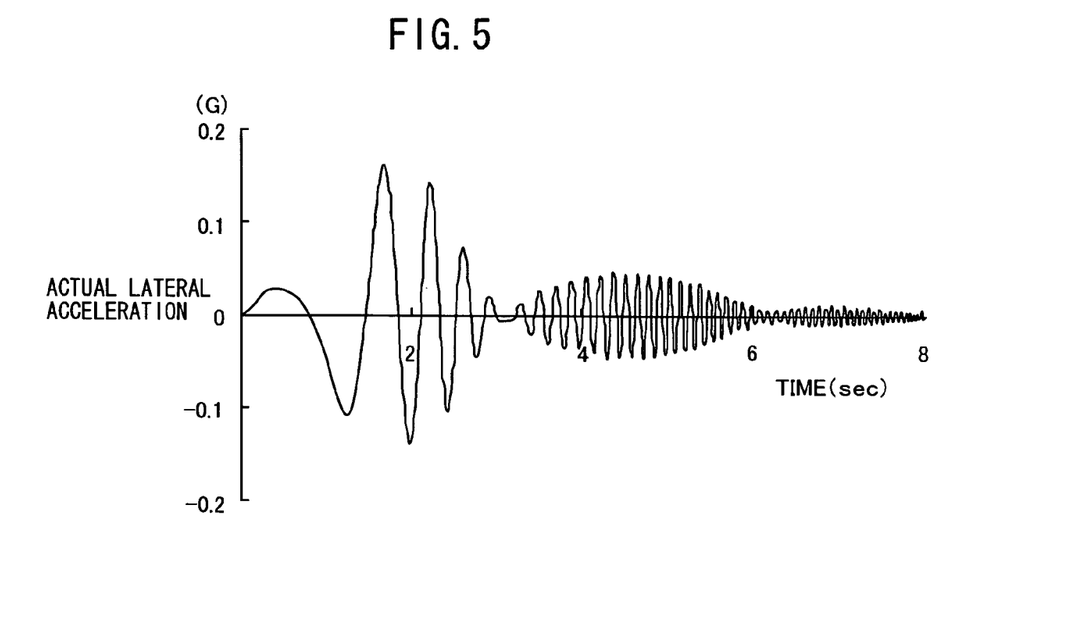
FIG. 5 is a diagram showing an example of a variation of actual lateral acceleration of a vehicle running on a roll-sweep road surface.

According to the apparatus for controlling efficiency of the stabilizer as described in the Japanese Publication No. 2000-71739, however, the lateral acceleration indicative of the turning level is not caused only by the turning operation of the vehicle, but it may be caused by a rough surface of a road, on which the vehicle is running. For example, the lateral acceleration may be caused by the rough surface of the road, even if the vehicle is moving straight, as shown in FIG. 5, in the case where the vehicle is running on such a road surface called as a roll-sweep that the road has a property of opposite phases at its right side and left side of a moving direction of the vehicle, with frequency and amplitude of the property being varied as time passes.

Basically, the stabilizer control apparatus is provided for controlling to restrain a roll angle of vehicle body caused at the time of turning operation of the vehicle. This can be achieved by controlling and actuating a stabilizer actuator to increase a torsional rigidity of a stabilizer in response to a lateral acceleration indicative of the turning operation. On the other hand, in order to improve the ride comfort, it is required to lower the torsional rigidity of the stabilizer, so as to prevent irregularity of the road surface from being transmitted to the vehicle body. Therefore, if the lateral acceleration is caused by the rough road surface, as described above, the stabilizer is controlled to increase its torsional rigidity in response to variation of the lateral acceleration. As a result, the stabilizer control will be made so as to act against change in rolling motion caused only by the rough road surface, while the vehicle is not in its turning operation, which control might result in deteriorating the ride comfort.

SUMMARY OF THE INVENTION

Accordingly, it is an object of the present invention to provide a stabilizer control apparatus which controls a stabilizer to ensure ride comfort against change in rolling motion of a vehicle body caused by a rough surface of a road, when the vehicle is moving straight, and which controls the stabilizer to restrain a roll angle of the vehicle body effectively, when the vehicle is turning.

In accomplishing the above and other objects, the stabilizer control apparatus is provided for controlling a torsional rigidity of a stabilizer disposed between a right wheel and a left wheel of a vehicle to control a rolling motion of a vehicle body actively in response to turning operation of the vehicle. The apparatus includes an actual lateral acceleration obtaining device for obtaining an information indicative of actual lateral acceleration of the vehicle, a calculated lateral acceleration obtaining device for obtaining an information indicative of calculated lateral acceleration of the vehicle, in response to steering operation of the vehicle, and a controller for setting influence amount caused by the calculated lateral acceleration obtaining device to be greater than influence amount caused by the actual lateral acceleration obtaining device, when the vehicle is moving straight. And, the controller is adapted to set the influence amount caused by the actual lateral acceleration obtaining device to be increased, with the turning operation of the vehicle being increased, to actively control the rolling motion of the vehicle body. The actual lateral acceleration obtaining device is adapted to obtain the information indicative of actual lateral acceleration, by detecting or calculating the same.

Or, the stabilizer control apparatus may include an actual lateral acceleration detection device for detecting an actual lateral acceleration actually acting on the vehicle, a vehicle speed detection device for detecting a speed of the vehicle, a steering angle detection device for detecting a steering angle provided in response to operation of a steering wheel of the vehicle, and an acceleration calculation device for obtaining a calculated lateral acceleration, on the basis of the vehicle speed detected by the vehicle speed detection device and the steering angle detected by the steering angle detection device. The apparatus further includes an externally applied force determination device for determining externally applied force for controlling the torsional rigidity of the stabilizer, on the basis of the calculated lateral acceleration obtained by the lateral acceleration calculation device and the actual lateral acceleration detected by the actual lateral acceleration detection device, a turning factor setting device for setting a turning factor indicative of turning operation of the vehicle, and a modification device for setting a control gain for the calculated lateral acceleration to be larger than a control gain relative to the actual lateral acceleration, when the turning factor set by the turning factor setting device is relatively small. And, the modification device is adapted to modify the control gain relative to the calculated lateral acceleration to be decreased, or modify the control gain relative to the actual lateral acceleration to be increased, when the turning factor set by the turning factor setting device is relatively large.

As an example of the factor for determining the externally applied force, a desired value of vehicle active roll moment (Rmv) may be calculated on the basis of a calculated lateral acceleration (Gye), a variation (dGye) of the calculated lateral acceleration, the actual lateral acceleration (Gya), a variation (Gya) of the actual lateral acceleration, as follows:

$$Rmv = K1 \cdot Gye + K2 \cdot dGye + K3 \cdot Gya + K4 \cdot dGya$$

where (K1) and (K2) are control gains relative to the calculated lateral accelerations, whereas (K3) and (K4) are control gains relative to the actual lateral accelerations.

In the stabilizer control apparatus as described above, the turning factor setting device is adapted to set the turning factor on the basis of at least one of a yaw rate which is detected by a yaw rate detection device, the calculated lateral acceleration, the actual lateral acceleration, and the steering angle.

BRIEF DESCRIPTION OF THE DRAWINGS

The above stated object and following description will become readily apparent with reference to the accompanying drawings, wherein like referenced numerals denote like elements, and in which.

DESCRIPTION OF THE PREFERRED EMBODIMENTS

Figure 1:
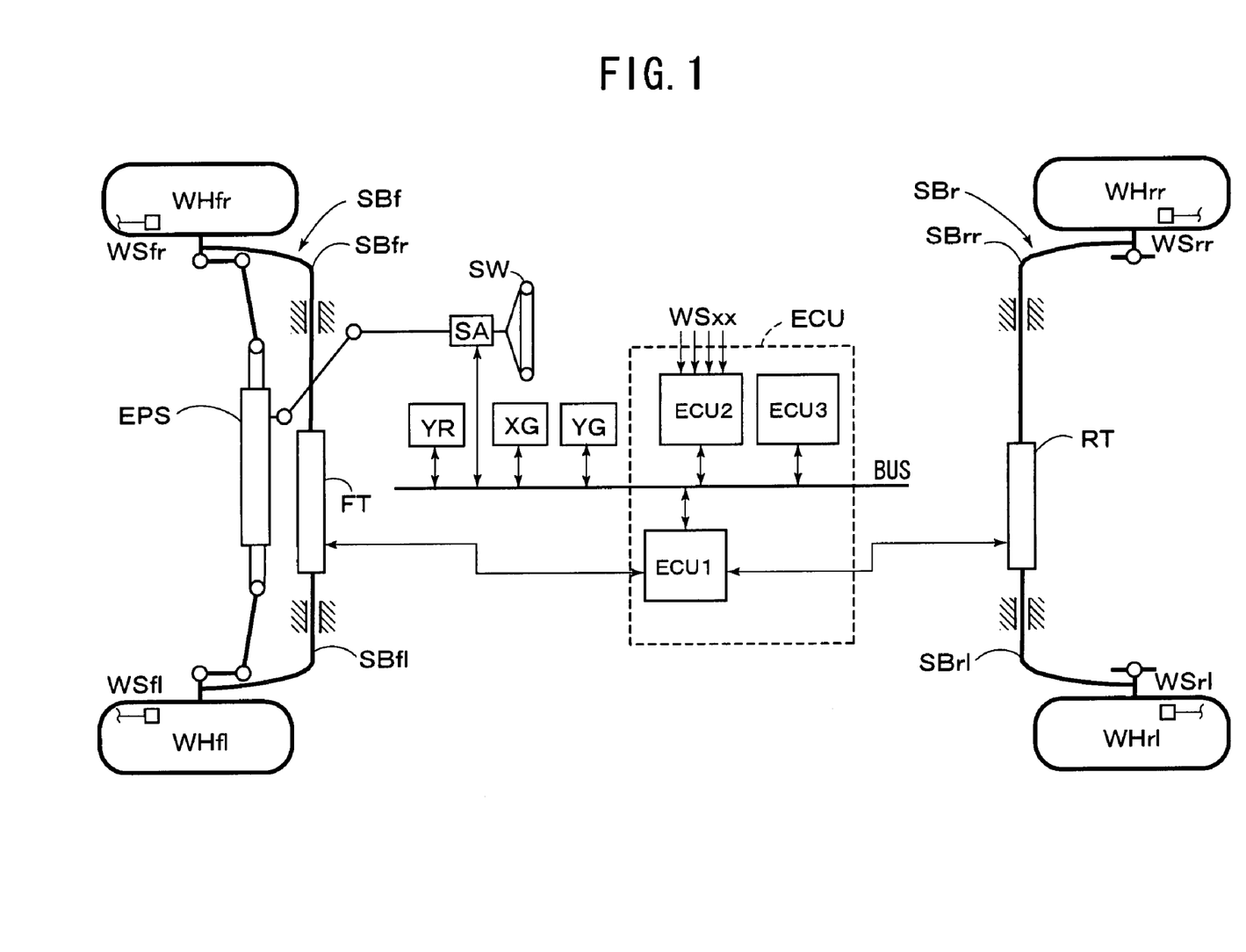
FIG. 1 is a schematic block diagram of a vehicle having a stabilizer control apparatus according to an embodiment of the present invention.

Referring to FIG. 1, there is schematically illustrated a vehicle with a stabilizer control apparatus according to an embodiment of the present invention. As shown in FIG. 1, a front stabilizer SBf and a rear stabilizer SBr are disposed to act as a torsion spring when a rolling motion is applied to a vehicle body (not shown). The front stabilizer SBf and rear stabilizer SBr are actuated by stabilizer actuators FT and RT, respectively, to control each torsional rigidity, so as to restrain a roll angle of vehicle body resulted from the rolling motion of the vehicle body. The stabilizer actuators FT and RT are controlled by a stabilizer control unit ECU1 provided in an electronic controller ECU.

As shown in FIG. 1, at each wheel WHxx of the vehicle, there is provided a wheel speed sensor WSxx, which is connected to the electronic controller ECU, and by which a signal having pulses proportional to a rotational speed of each wheel, i.e., a wheel speed signal is fed to the electronic controller ECU. "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. Furthermore, there are provided a steering angle sensor SA for detecting a steering angle (handle angle) ($\delta f$) provided in response to operation of a steering wheel SW, a longitudinal acceleration sensor XG for detecting a vehicle longitudinal acceleration (Gx), a lateral acceleration sensor YG for detecting an actual lateral acceleration (Gya) of a vehicle, a yaw rate sensor YR for detecting a yaw rate (Yr) of the vehicle, and so on, which are electrically connected to the electronic controller ECU. In addition to the stabilizer control unit ECU1 as described above, the electronic controller ECU includes a brake control unit ECU2, steering control unit ECU3 and the like, which are connected to a communication unit (not shown) having a CPU, ROM and RAM for communication, through a communication bus. Therefore, the information for each control system can be fed from other control systems.

Figure 2:
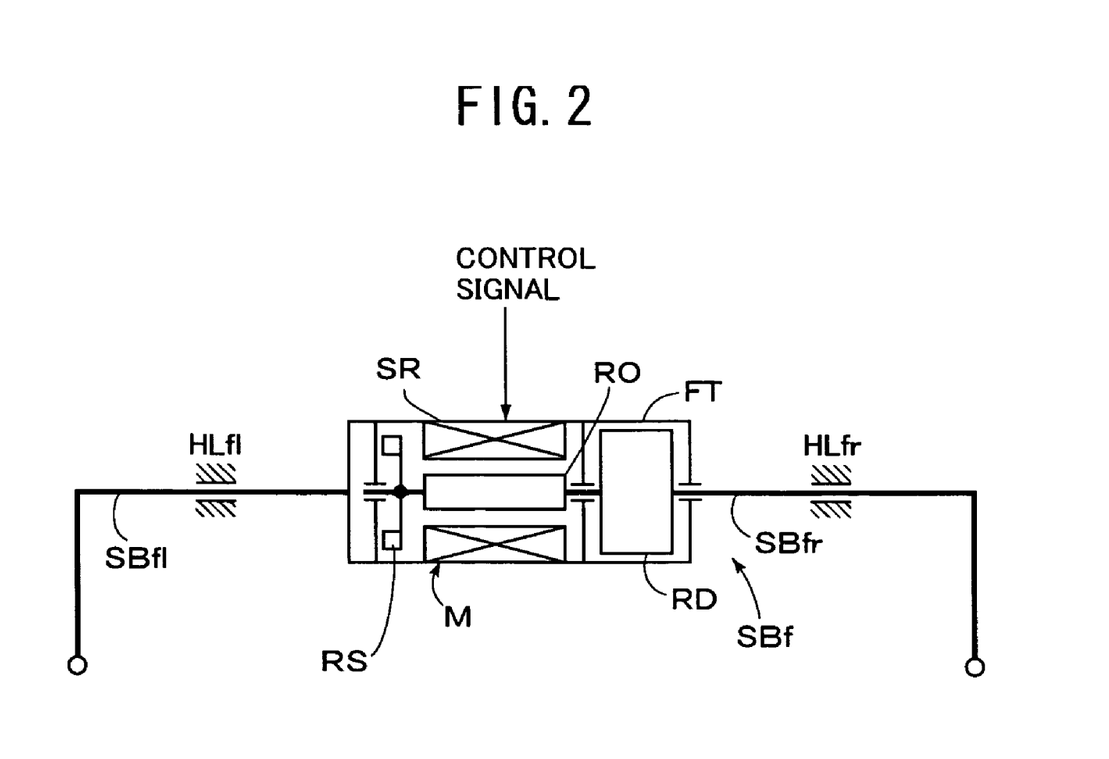
FIG. 2 is a block diagram illustrating a practical example of a stabilizer actuator according to an embodiment of the present invention.

As shown in FIG. 2, the stabilizer actuator FT includes a front stabilizer SBf, which is provided with a pair of (right and left) stabilizer bars SBfr and SBfl, one end of each bar is connected to a right or left wheel (not shown), and the other end of one bar is connected to a rotor RO of an electric motor M through a speed reducing mechanism (or, speed reducer) RD, and the other end of the other one bar is connected to a stator SR of the motor M. The stabilizer bars SBfr and SBfl are mounted on a vehicle body (not shown) by holding members HLfr and HLfl. The stabilizer actuator RT is constituted in the same manner as described above. When the motor M is energized, torsion force is created on each of the divided stabilizer bars SBfr and SBfl, so that apparent torsion spring property of the front stabilizer SBf is changed, whereby the roll rigidity of the vehicle body is controlled. A rotational angle sensor RS is disposed in the stabilizer actuator FT, to act as a rotational angle detection device for detecting a rotational angle of the motor M. As for a power source for the stabilizer actuator, instead of the electric motor M, a pump actuated by a motor or an engine (not shown) may be used, to control hydraulic pressure fed to actuate the stabilizer actuator.

Next, referring to FIG. 3, will be explained the active roll restraining control, wherein the information including the steering angle (handle angle) ($\delta f$) is detected by a vehicle driver operation detection device M11, and wherein vehicle motion variable including the vehicle speed, lateral acceleration and yaw rate is detected by a vehicle running condition detection device M12. On the basis of the detected information, a desired value of vehicle active roll moment is calculated at a block M13 to achieve a desirable rolling performance of the vehicle. At a vehicle behavior determination block M14, a vehicle steering performance (oversteer or understeer) is determined on the basis of the steering operation of the vehicle driver and the vehicle motion variable. Next, the desired value of the front and rear roll rigidity ratio is calculated at a block M15 on the basis of the calculated steering performance and vehicle motion variable. Based on the desired values of vehicle active roll moment and the roll rigidity ratios, the desired values of active roll moment for the front and rear wheels are calculated at a block M16. Then, on the basis of these desired values, the stabilizer actuators FT and RT are controlled at an actuator servo block M17.

Figure 3:
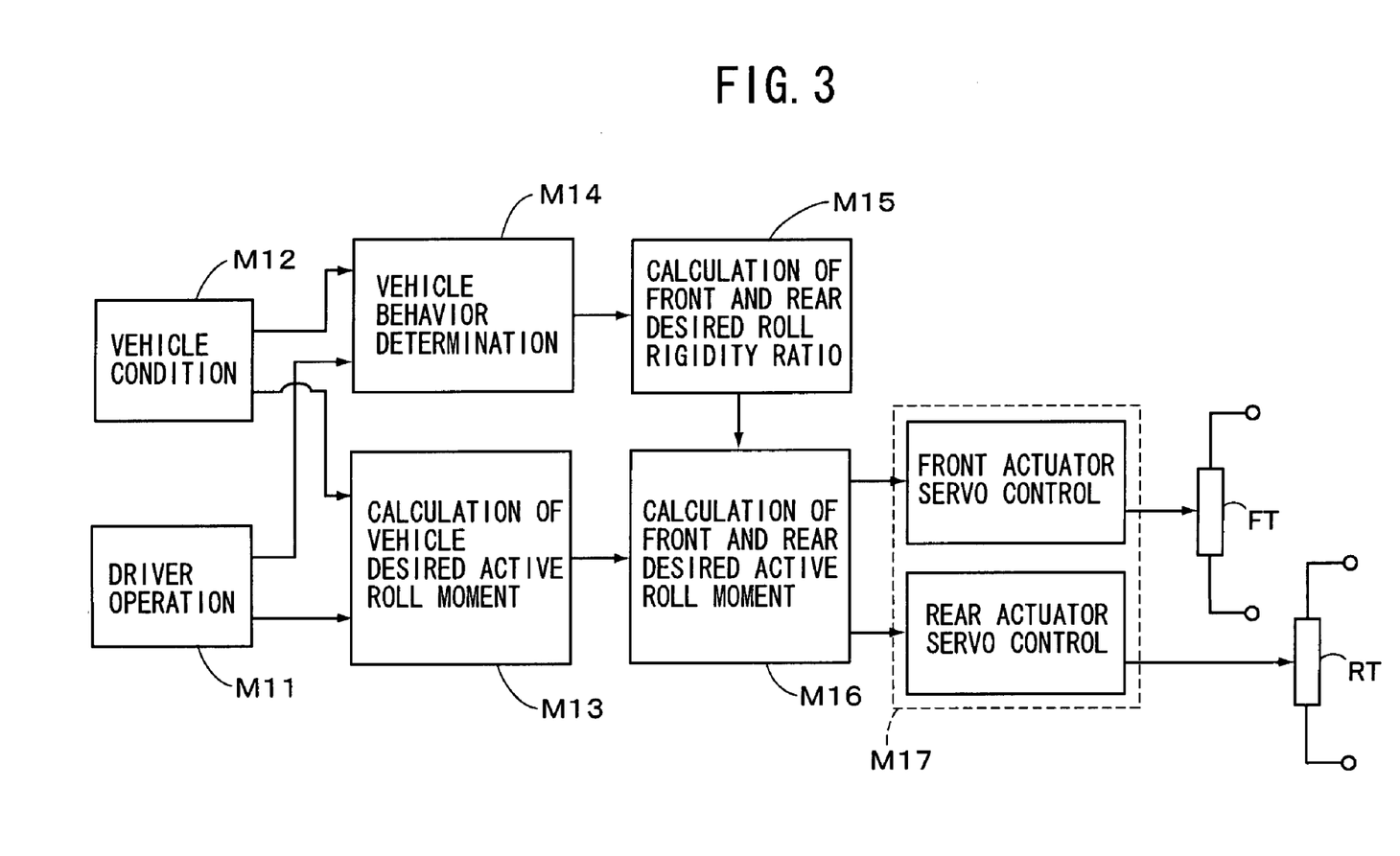
FIG. 3 is a block diagram of an active roll restraining control according to an embodiment of the present invention.
Figure 4:
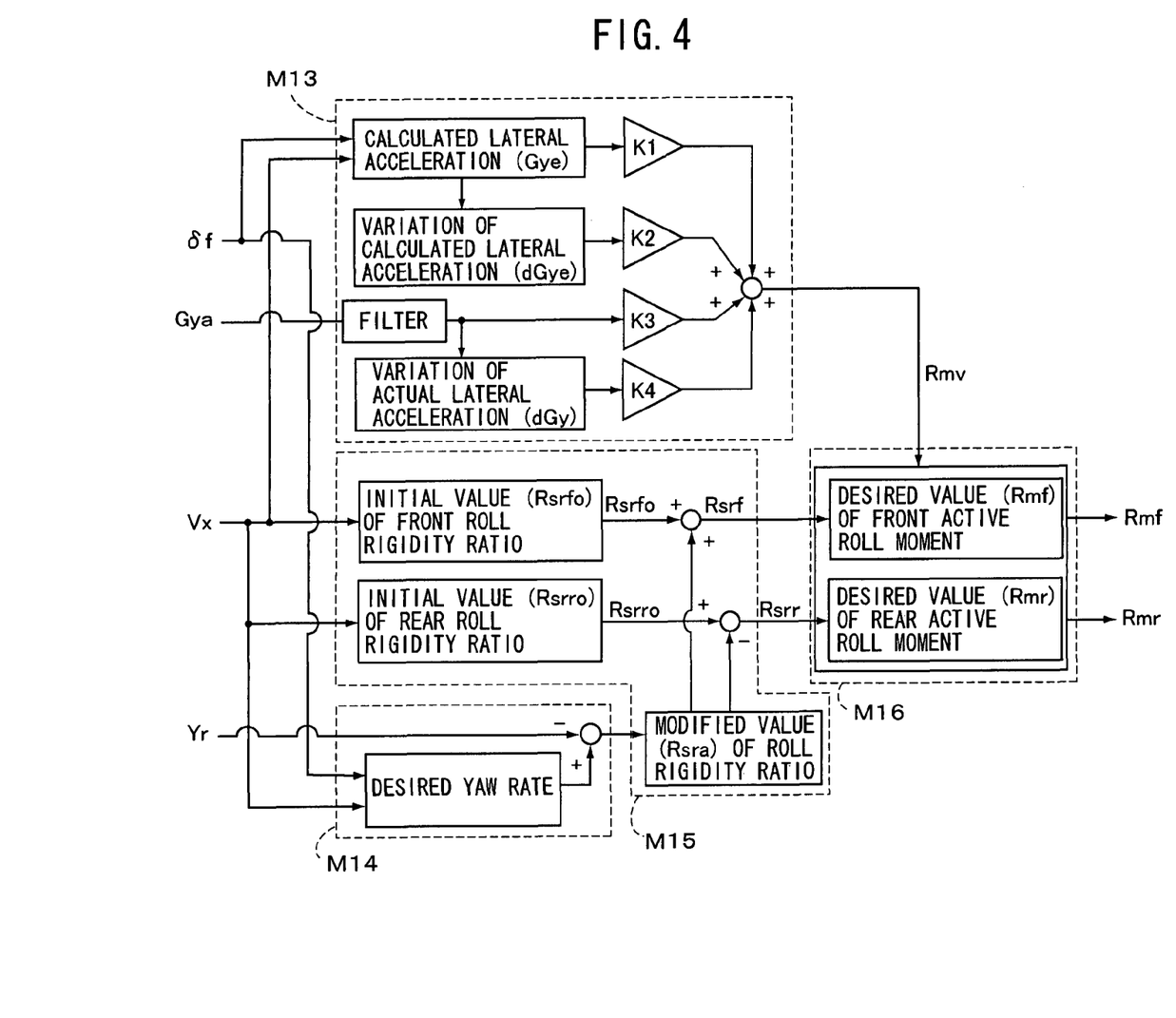
FIG. 4 is a block diagram of an example of the active roll restraining control as shown in FIG. 3.
Figure 22:
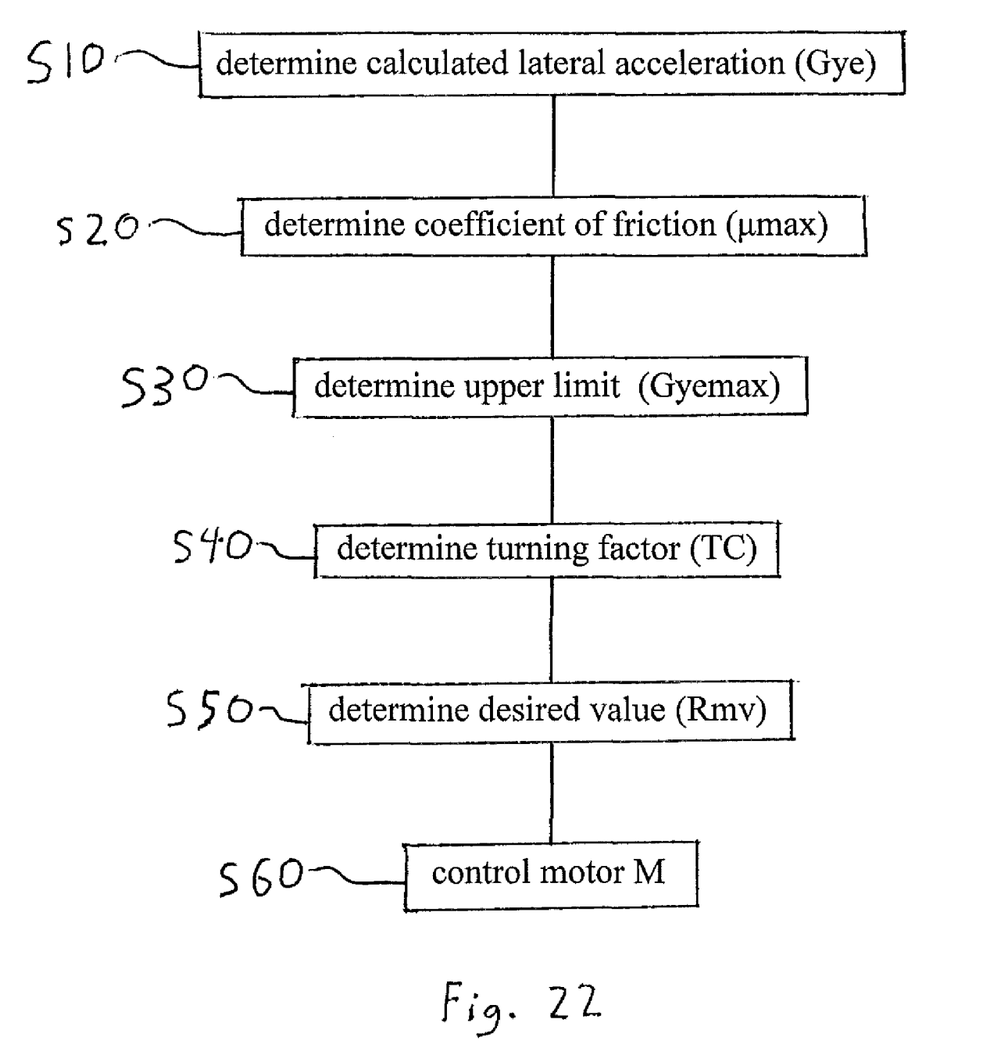
FIG. 22 is a flowchart illustrating an exemplary algorithm according to an exemplary embodiment of the present invention.

FIG. 4 shows an example of the embodiment as shown in FIG. 3, wherein a desired value (Rmv) of vehicle active roll moment for restraining the rolling motion of the vehicle as a whole is calculated at the block M13, on the basis of the actual lateral acceleration (Gya) detected by the lateral acceleration sensor YG, the variation of actual lateral acceleration (dGya) obtained by differentiating the actual lateral acceleration (Gya), the calculated (or, estimated) lateral acceleration (Gye) calculated by the steering angle (handle angle) ($\delta f$) and vehicle speed (Vx), and the variation of the calculated lateral acceleration (dGye) obtained by differentiating the calculated lateral acceleration (Gye). The calculated lateral acceleration (Gye) can be obtained by the following equation (1):

$$Gye=(Vx^2 \cdot \delta f)/\{L \cdot N \cdot (1+Kh \cdot Vx^2)\} \qquad (1)$$

where "L" is a wheel base, "N" is a steering gear ratio, and "Kh" is a stability factor. Determination of the calculated lateral acceleration (Gye) as discussed above corresponds to an exemplary embodiment of step S10 in FIG. 22.

Consequently, the desired value (Rmv) of active roll moment to be applied to the vehicle as a whole to achieve an appropriate rolling performance can be obtained by the following equation (2):

$$Rmv=K1 \cdot Gye+K2 \cdot dGye+K3 \cdot Gya+K4 \cdot dGya \qquad (2)$$

where (K1)-(K4) are control gains, and will be set as described later, in view of circumstances as follows. Determination of the desired value (Rmv) as discussed above corresponds to an exemplary embodiment of step S50 in FIG. 22.

Figure 6:
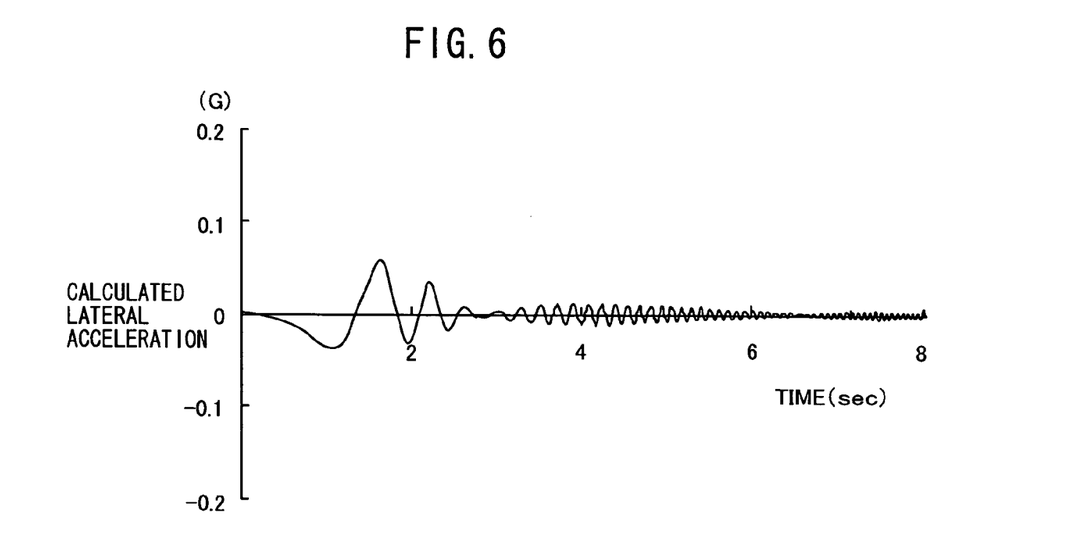
FIG. 6 is a diagram showing an example of a variation of calculated lateral acceleration of a vehicle running on a roll-sweep road surface.

At the outset, comparing with the actual lateral acceleration (Gya) detected by the lateral acceleration sensor YG and the calculated lateral acceleration (Gye) obtained on the basis of the steering angle ($\delta f$) and the vehicle speed (Vx), the actual lateral acceleration (Gya) is influenced by the irregularity of road surface, and the actual lateral acceleration (Gya) is delayed, because it is obtained as a result of steering operation. However, the actual lateral acceleration (Gya) is of a value for surely reflecting the road surface condition, e.g., coefficient of friction of the road surface. On the contrary, the calculated lateral acceleration (Gye) is not influenced by the irregularity of road surface, and obtained by the steering inputs, i.e., steering angle ($\delta f$) and vehicle speed (Vx), so that it will be hardly delayed. However, the calculated lateral acceleration (Gye) is not of a value for reflecting the road surface condition (e.g., coefficient of friction), so that its accuracy will be lowered, if the vehicle is turning in such a state as exceeding a frictional limit. In the case where the vehicle is running on the roll-sweep road surface as shown in FIG. 5, for example, the calculated lateral acceleration (Gye) obtained on the basis of the steering angle ($\delta f$) and the vehicle speed (Vx), varies as shown in FIG. 6. That is, in order to keep the vehicle moving straight, the vehicle driver has to operate the steering wheel in response to the inputs caused by the rough surface of the road. However, variation of the calculated lateral acceleration (Gye) obtained in response to the steering operation is much smaller than the variation of the actual lateral acceleration (Gya) detected by the lateral acceleration sensor YG.

According to the present embodiment, therefore, the control gains (K1-K4) in the above-described equation (2) are modified in response to the vehicle running condition or the like as described later, so that issues relative to the actual lateral acceleration (Gya) and issues relative to the calculated lateral acceleration (Gye) are supplemented with each other. For example, in the case where the vehicle is moving straight or moving with a relatively small turning operation, it is so constituted that only the calculated lateral acceleration (Gye) is used, or that the same is largely contributed to the stabilizer control, thereby to acieve the active roll restraining control. Consequently, the lateral acceleration caused by the vehicle turning operation and lateral acceleration caused by the rough surface of the road can be clearly distinguished, to improve the ride comfort, and surely restrain the rolling motion in the turning operation. The control gains (K1-K4) used in the above-described equation (2) will be explained in sequence hereinafter.

Figure 7:
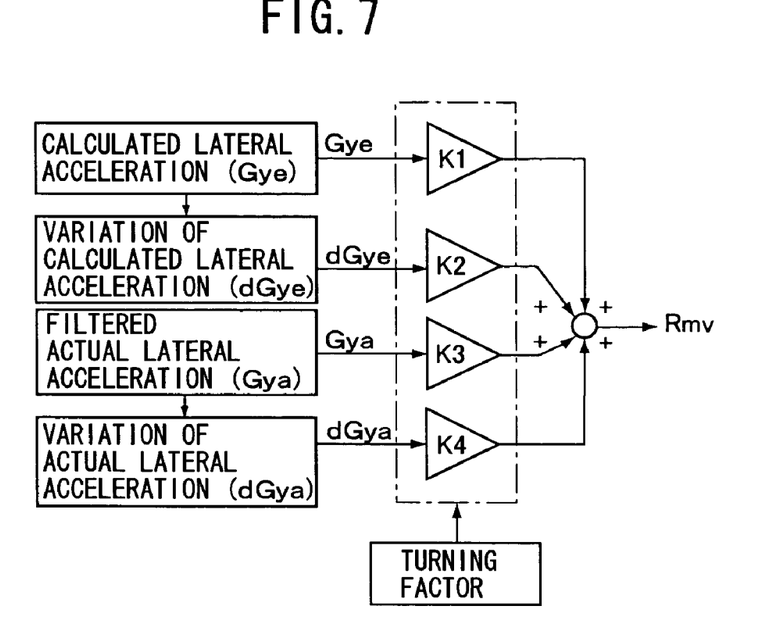
FIG. 7 is a block diagram of an example of embodiment for providing control gains relative to a calculated lateral acceleration, and control gains relative to an actual lateral acceleration, on the basis of a turning factor, according to an embodiment of the present invention.

FIG. 7 shows an embodiment for providing the control gains (K1) and (K2) relative to the calculated lateral acceleration (Gye), and the control gains (K3) and (K4) relative to the actual lateral acceleration (Gya), on the basis of a turning factor (TC), which is a factor indicative of a level of turning operation, as indicated by large or small. In order to compensate the influence caused by the irregularity of road surface, it is required to provide the turning factor (TC) to be the one hardly influenced by the irregularity of road surface, so that it is desirable to select one of the calculated lateral acceleration (Gye), steering angle (δf) and yaw rate (Yr), or two or more of them combined, for the turning factor (TC). As the lateral acceleration influenced by the irregularity of road surface is approximately 0.1 G at most ("G" is a gravitational acceleration), the actual lateral acceleration (Gya) may be used for the turning factor (TC), while it is influenced by the irregularity of road surface. Determination of the turning factor (TC) as discussed above corresponds to an exemplary embodiment of step S40 in FIG. 22.

Figure 8:
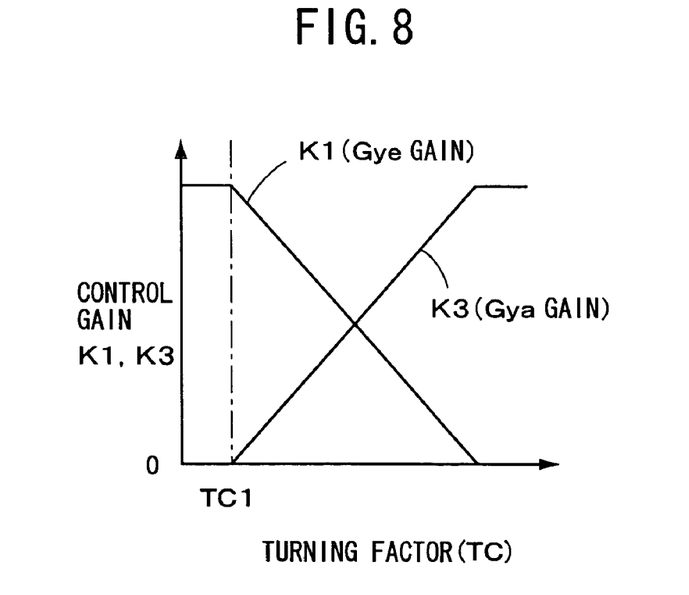
FIG. 8 is a diagram of an example of a map for providing a control gain for a calculated lateral acceleration, and a control gain for an actual lateral acceleration, on the basis of a turning factor, according to an embodiment of the present invention.
Figure 9:
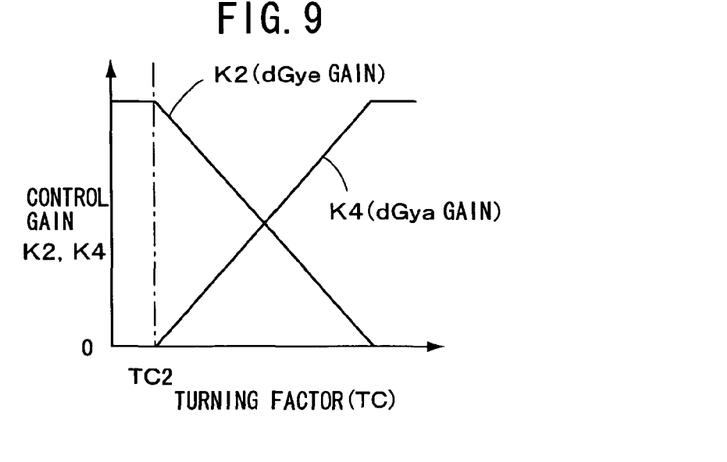
FIG. 9 is a diagram of an example of a map for providing a control gain for a variation of calculated lateral acceleration, and a control gain for a variation of actual lateral acceleration, on the basis of a turning factor, according to an embodiment of the present invention.

For example, FIG. 8 shows a map for providing the control gain (K1) for the calculated lateral acceleration (Gye) and the control gain (K3) for the actual lateral acceleration (Gya), on the basis of the turning factor (TC), respectively. Particularly, in the case where the turning factor (TC) is small, e.g., TC≦TC1, the control gain (K3) for the actual lateral acceleration (Gya) is set to be zero, so that the control may be performed in response to the calculated lateral acceleration (Gye), which is obtained on the basis of the steering angle (δf). Also, a map may be provided for providing the control gain (K2) for the variation of calculated lateral acceleration (dGye) and the control gain (K4) for the variation of actual lateral acceleration (dGya), on the basis of the turning factor (TC), respectively, as shown in FIG. 9. In the case where the turning factor (TC) is small, e.g., TC≦TC2, the control gain (K4) for the variation of actual lateral acceleration (dGya) is set to be zero, so that the control may be performed in response to the variation of calculated lateral acceleration (dGye), which is obtained on the basis of the steering angle (δf). Thus, in the case where the turning factor (TC) is relatively small, it is preferable to increase the control gain for the variation of calculated lateral acceleration (dGye), which is hardly influenced by the irregularity of road surface, so that the influence caused by the rough surface of the road can be restrained, to improve the ride comfort.

Figure 10:
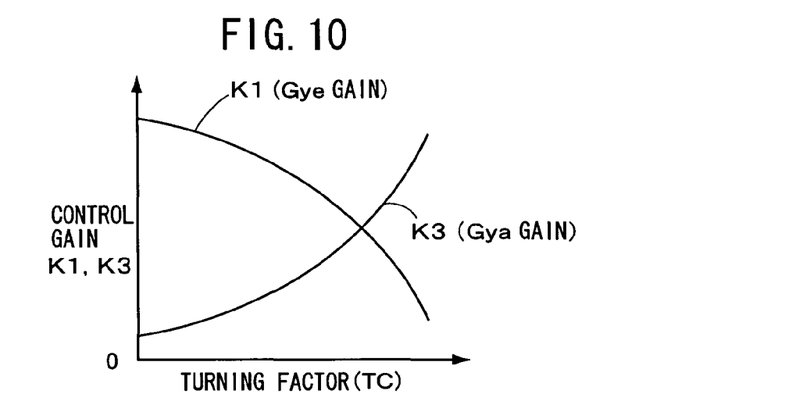
FIG. 10 is a diagram of an example of a map for setting a non-linear control gain characteristic to a control gain for a calculated lateral acceleration, and a control gain for an actual lateral acceleration, according to an embodiment of the present invention.
Figure 11:
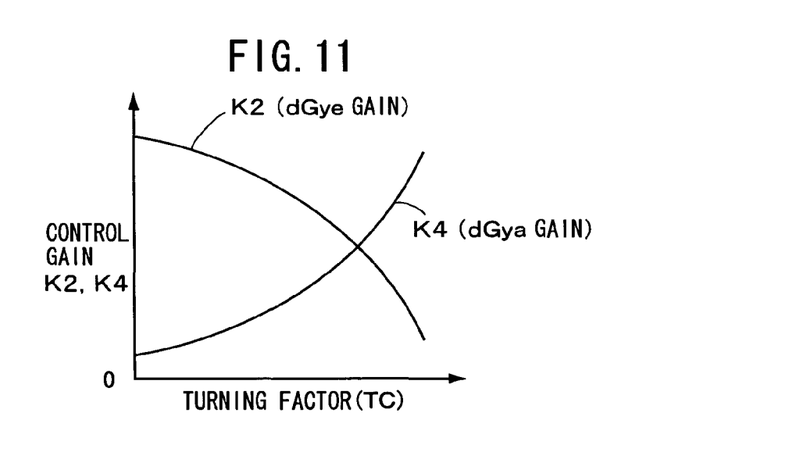
FIG. 11 is a diagram of an example of a map for setting a non-linear control gain characteristic to a control gain for a variation of calculated lateral acceleration, and a control gain for a variation of actual lateral acceleration, according to an embodiment of the present invention.

According to the maps as shown in FIGS. 8 and 9, the control is performed in response to only the calculated lateral acceleration (Gye) in FIG. 8, and only the variation of calculated lateral acceleration (dGye) in FIG. 9, in the case where the turning factor (TC) is relatively small. However, the present invention is not limited to them, and may be used such information indicative of the calculated lateral acceleration including at least one of (Gye) and (dGye) that is hardly influenced by the irregularity of road surface, as explained hereinafter. That is, in the case where the turning level is relatively small, the influence amount caused by the information indicative of the calculated lateral acceleration may be set to be large, whereby the ride comfort can be improved. In this case, the influence amount caused by the information indicative of the calculated lateral acceleration does not necessarily have to be set as 100%, there may be remained the influence amount caused by the information indicative of the actual lateral acceleration including at least one of (Gya) and (dGya). Or, as shown in the maps of FIGS. 10 and 11, may be provided a non-linear characteristic of control gain for the information indicative of the calculated lateral acceleration, or may be provided a characteristic with a polygonal line which is approximate to the non-linear characteristic. With the turning operation of the vehicle being increased, the influence amount caused by the information indicative of the calculated lateral acceleration is decreased, whereas the influence amount caused by the information indicative of the actual lateral acceleration is increased, whereby the influence caused by the rough surface of the road can be restrained, when the vehicle is moving straight, and the rolling motion of the vehicle body can be restrained surely, when the vehicle is turning.

Furthermore, with the control gain being provided on the basis of the turning factor (TC), compensation for a variation of the coefficient of friction of the road surface will be made effectively, as described later. In order to obtain the calculated lateral acceleration (Gye) reflecting the coefficient of friction, it is required to obtain the information indicative of coefficient of friction (μmax). However, as the coefficient of friction is the one to be estimated, there could be a case where it is determined that the road is of relatively high coefficient of friction, while it is in fact the road of relatively low coefficient of friction. This might result in applying excessive amount of active roll control to the stabilizer, to cause a reverse rolling motion, which might give a vehicle driver a different feeling from the one he expected. In this case, it is preferable to set the influence amount caused by the actual lateral acceleration (Gya) to be increased, and set the influence amount caused by the calculated lateral acceleration (Gye) to be decreased, with the turning operation of the vehicle indicated by the turning factor (TC) being increased, whereby the issue of reverse rolling motion could be solved.

Figure 12:
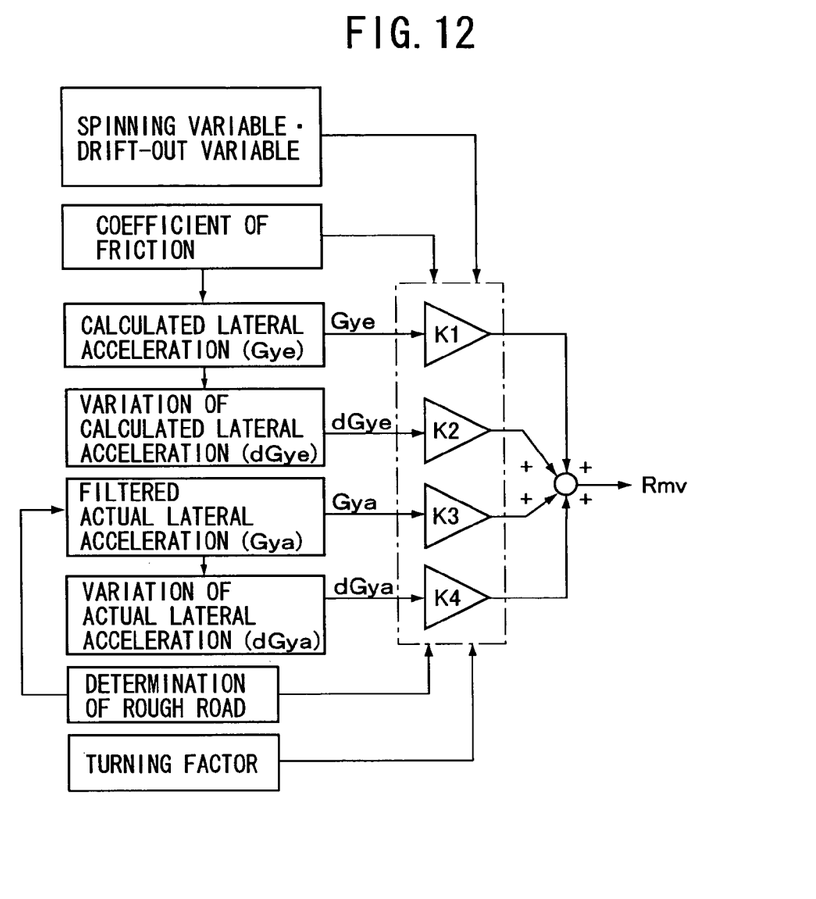
FIG. 12 is a block diagram of an example of embodiment for providing control gains relative to a calculated lateral acceleration, and control gains relative to an actual lateral acceleration, on the basis of a road condition or the like, according to an embodiment of the present invention.

In addition to the turning factor (TC) as described above, it is possible to set the control gains on the basis of the result of determination of rough road, coefficient of friction, spinning state variable (spin value) and drift-out state variable (drift value) indicative of turning state of the vehicle, or the like, as shown in FIG. 12 as an embodiment. With respect to the device for determining the rough road, may be used a device for determining it based on wheel speeds, as disclosed in the Japanese Patent Laid-open Publication No. 9-20223, or may be used a device for determining it on the basis of a result detected by an acceleration sensor, as disclosed in the Japanese Patent Laid-open Publication No. 2001-63544. In general, those results are used for an anti-skid control (ABS), so that they are processed at the brake control unit ECU2. The spinning variable (spin value) and drift-out variable (drift value) are required for performing a vehicle stability control, so that these are processed at the brake control unit ECU2, according to a process as disclosed in the Japanese Patent Laid-open Publication No. 9-193776, for example. And, the coefficient of friction may be calculated at the brake control unit ECU2 or the steering control unit ECU3, according to various known methods. Determination of the coefficient of friction as discussed above corresponds to an exemplary embodiment of step S20 in FIG. 22. Then, the determined result and the variable are input to the stabilizer control unit ECU1 through a communication bus.

Figure 13:
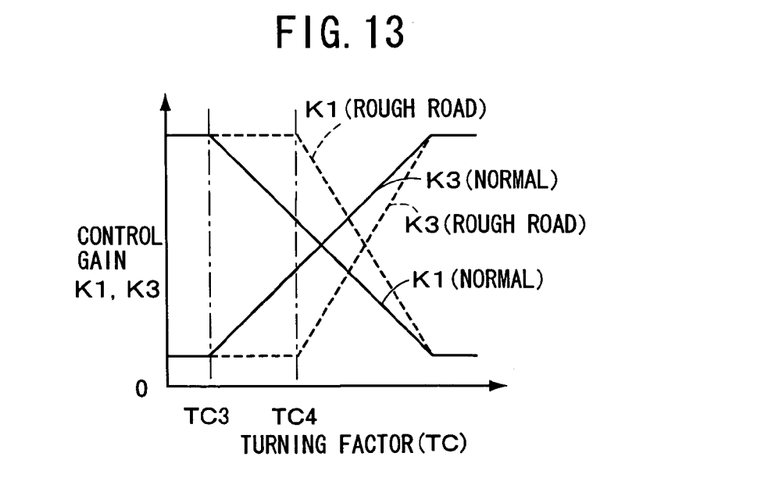
FIG. 13 is a diagram of an example of a map for providing control gains relative to a calculated lateral acceleration, and control gains relative to an actual lateral acceleration, on the basis of a result of determining a rough road, according to an embodiment of the present invention.
Figure 14:
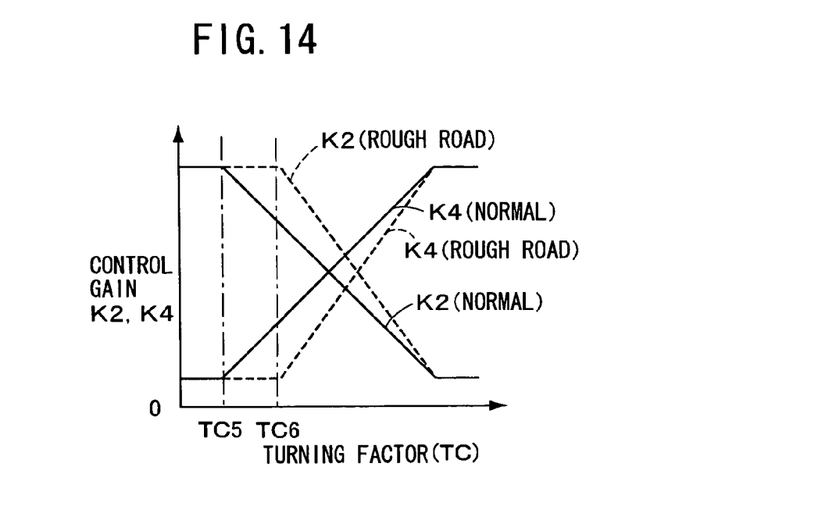
FIG. 14 is a diagram of an example of a map for providing control gains relative to a variation of calculated lateral acceleration, and control gains relative to a variation of actual lateral acceleration, on the basis of a result of determining a rough road, according to an embodiment of the present invention.

FIGS. 13 and 14 show an example of a map for providing control gains on the basis of the result of determination of rough road, as described above. In the case where it is determined that the road surface is rough, rates contributed by the control gains (K1) and (K2) relative to the calculated lateral acceleration (Gye) are increased to be larger than the rates contributed by those in such a normal state that the road surface is not determined to be rough. And, in the case where the road surface is determined to be rough, the rates contributed by the control gains (K3) and (K4) relative to the actual lateral acceleration (Gya) are decreased to be smaller than the rates contributed by those in the normal state. With the control gains being changed as described above, if it is determined that the vehicle is running on a rough road with relatively large irregularity, the rates contributed by the control gains (K1) and (K2) relative to the calculated lateral acceleration (Gye) are increased, whereas the rates contributed by the control gains (K3) and (K4) relative to the actual lateral acceleration (Gya) are decreased, thereby to prevent the ride comfort from being deteriorated. Furthermore, if it is determined that the vehicle is running on the rough road, parameters to the filter for the actual lateral acceleration (Gya) as shown in FIG. 12 are changed to reduce a noise to the actual lateral acceleration (Gya). Although signals to be transmitted may be delayed contrary to reduction of the noise, if it is determined that the vehicle is running on the rough road, the rates contributed by the control gains (K1) and (K2) relative to the calculated lateral acceleration (Gye) are increased, so that the delay will be compensated.

Figure 15:
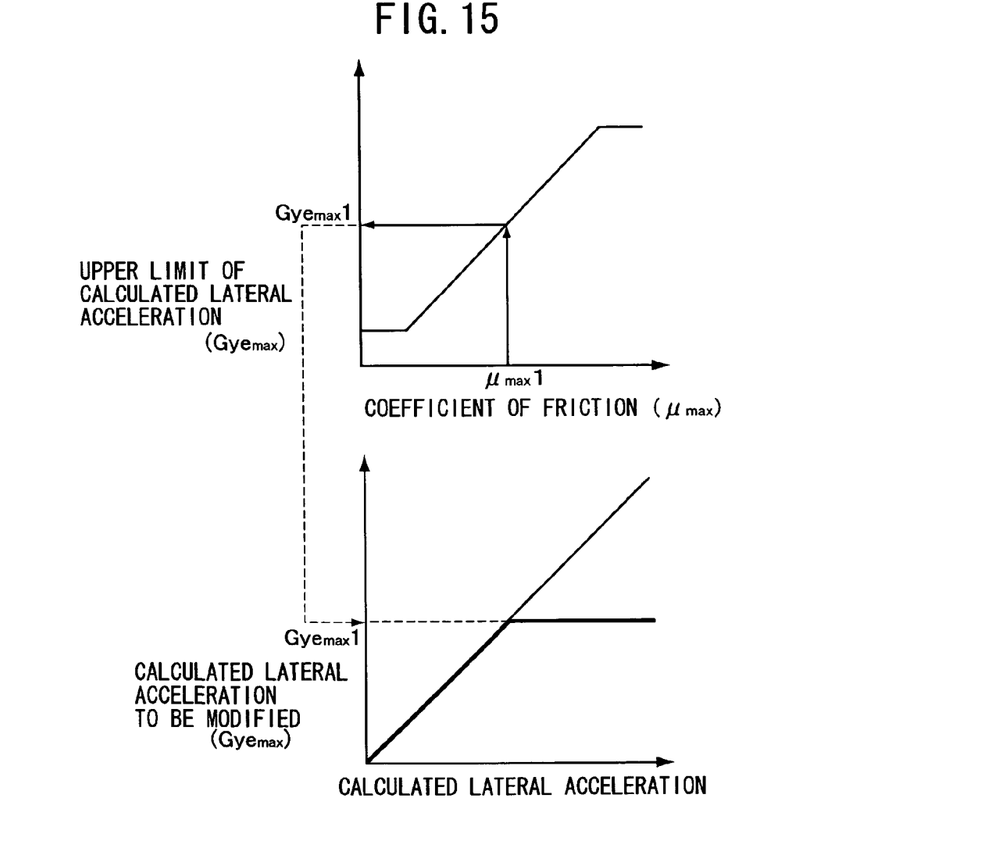
FIG. 15 is a diagram of an example of a map for determining an upper limit of calculated lateral acceleration, on the basis of a road surface coefficient of friction, according to an embodiment of the present invention.

Next, in order to obtain the calculated lateral acceleration (Gye) accurately in response to the coefficient of friction of the road surface, the coefficient of friction (μmax) calculated at the brake control unit ECU2 or steering control unit ECU3 is input to the stabilizer control unit ECU1 through the communication bus. The calculated lateral acceleration (Gye) is modified according to the coefficient of friction (μmax), as shown in FIG. 15. As the coefficient of friction (μmax) is provided for setting a maximal lateral acceleration which could be created on that road surface, an upper limit (Gyemax) of the calculated lateral acceleration (Gye) is determined on the basis of the coefficient of friction (μmax). For example, in the case where the coefficient of friction (μmax) is μ max1 (e.g., 0.4) as shown in the upper section of FIG. 15, and the upper limit (Gyemax) of the calculated lateral acceleration is set to be Gyemax1 (e.g., 0.4 G), even if the calculated lateral acceleration (Gye) is calculated as 0.6 G, it will be output as Gyemax1 (=0.4 G) as shown in the lower section of FIG. 15. Determination of the upper limit (Gyemax) as discussed above corresponds to an exemplary embodiment of step S30 in FIG. 22. As a result, accuracy of the calculated lateral acceleration can be improved to be responsive to the actual condition of the road surface.

Figure 16:
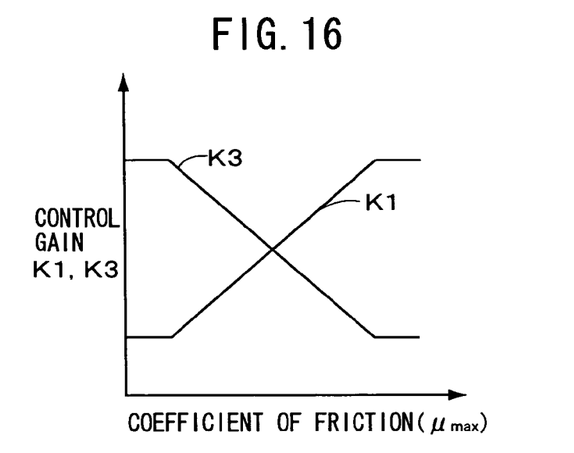
FIG. 16 is a diagram of an example of a map for providing a control gain for a calculated lateral acceleration, and a control gain for an actual lateral acceleration, on the basis of a road surface coefficient of friction, according to an embodiment of the present invention.
Figure 17:
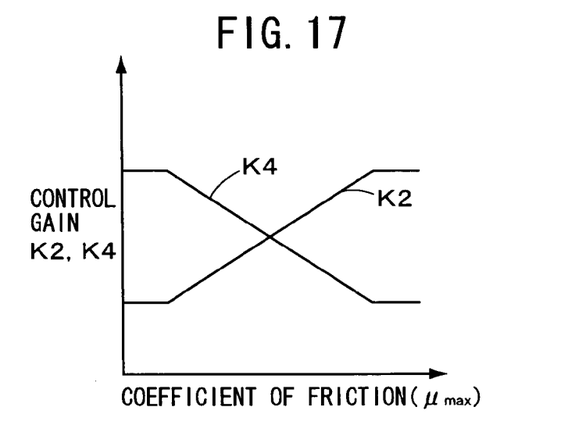
FIG. 17 is a diagram of an example of a map for providing a control gain for a variation of calculated lateral acceleration, and a control gain for a variation of actual lateral acceleration, on the basis of a road surface coefficient of friction, according to an embodiment of the present invention.

Alternatively, the compensation for the coefficient of friction can be made by modifying the control gains. As shown in FIGS. 16 and 17, in the case where it is determined that the coefficient of friction (μmax) is relatively low for example, the rate contributed by the calculated lateral acceleration (Gye) is decreased, and the rate contributed by the actual lateral acceleration (Gya) is increased. FIGS. 16 and 17 show a map for providing a control gain on the basis of the coefficient of friction, wherein if the coefficient of friction (μmax) is relatively low, the rates contributed by the control gains (K1) and (K2) relative to the calculated lateral acceleration (Gye) are set to be relatively low, whereas the rate contributed by the control gains (K3) and (K4) relative to the actual lateral acceleration (Gya) are set to be relatively high. And, if the coefficient of friction (μmax) is relatively high, the rates contributed by the control gains (K1) and (K2) are set to be relatively high, whereas the rates contributed by the control gains (K3) and (K4) are set to be relatively low.

Figure 18:
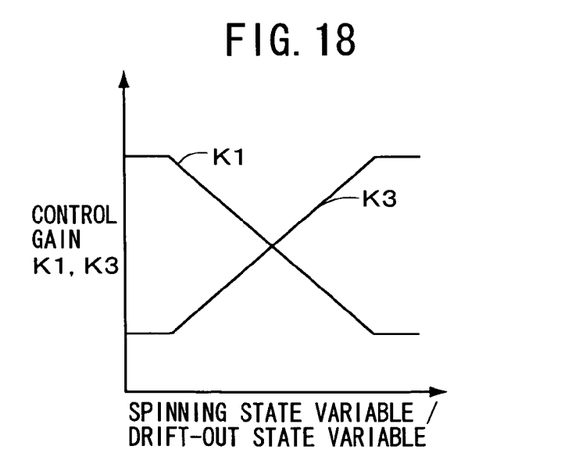
FIG. 18 is a diagram of an example of a map for providing a control gain for a calculated lateral acceleration, and a control gain for an actual lateral acceleration, on the basis of a spinning state variable or drift-out state variable, according to an embodiment of the present invention.
Figure 19:
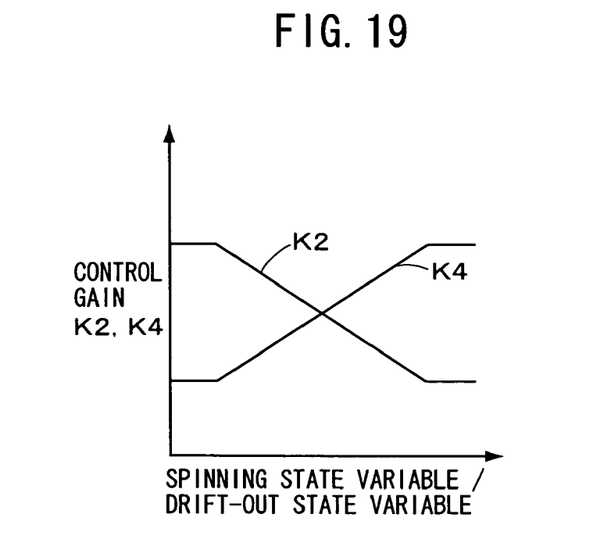
FIG. 19 is a diagram of an example of a map for providing a control gain for a variation of calculated lateral acceleration, and a control gain for a variation of actual lateral acceleration, on the basis of a spinning state variable or drift-out state variable, according to an embodiment of the present invention.

Furthermore, the influence caused by the coefficient of friction can be compensated by the state variable obtained in the vehicle stability control. FIGS. 18 and 19 show a map for providing control gains on the basis of the spinning state variable (spinning value) and drift-out state variable (drift-out value). As shown in FIGS. 18 and 19, in the case where output of the spinning value (SV) or drift-out value (DV) is relatively large for example, the rates contributed by the control gains (K3) and (K4) relative to the actual lateral acceleration (Gya) may be increased, whereas the rates contributed by the control gains (K1) and (K2) relative to the calculated lateral acceleration (Gye) may be decreased.

Figure 20:
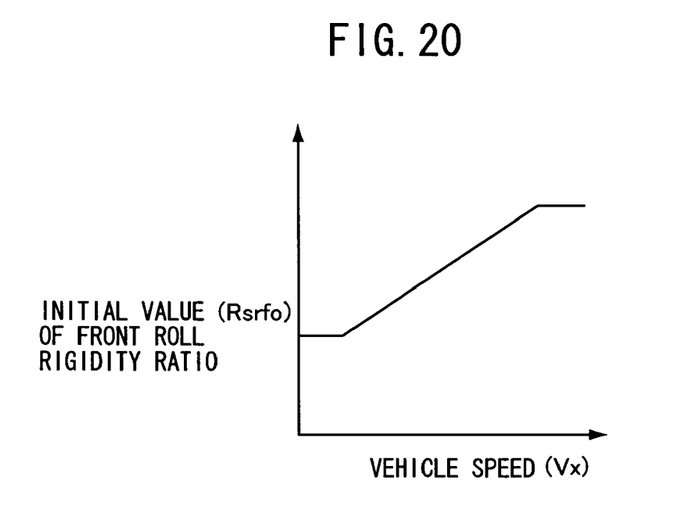
FIG. 20 is a diagram showing an example of a map for providing an initial value of a front roll rigidity ratio according to an embodiment of the present invention.

Referring back to FIG. 4, the desired value of the front and rear roll rigidity ratio is calculated at the block M15 as follows. At the outset, the initial values (Rsrfo) and (Rsrro) are set for the front roll rigidity ratio and rear roll rigidity ratio, respectively, on the basis of the vehicle speed (Vx). As shown in FIG. 20, the initial value (Rsrfo) for the front roll rigidity ratio is set to be relatively low when the vehicle is running at relatively low speed, whereas it is set to be relatively high when the vehicle is running at relatively high speed, to force the vehicle to be likely in the understeer condition when the vehicle is running at relatively high speed. Then, the initial value (Rsrro) for the rear roll rigidity ratio is set to be (1-Rsrfo). Next, a desired yaw rate (Yre) is calculated on the basis of the steering angle (δf) and vehicle speed (Vx) at the vehicle behavior determination block M14, to determine the vehicle steering performance, and then compared with the actual yaw rate (Yr) to obtain a yaw rate deviation (ΔYr), on the basis of which a modified value (Rsra) for the roll rigidity ratio is calculated. As a result, when the vehicle is likely to be in the understeer condition, the front roll rigidity ratio is modified to be decreased, and the rear roll rigidity ratio is modified to be increased. On the contrary, when the vehicle is likely to be in the oversteer condition, the front roll rigidity ratio is modified to be increased, and the rear roll rigidity ratio is modified to be decreased. Then, the desired value (Rmf) of active roll moment for the front wheel and the desired value (Rmr) of active roll moment for the rear wheel are calculated at the block M16, on the basis of the desired value (Rmv) of vehicle active roll moment, the desired value (Rsrf) of the front roll rigidity ratio, and the desired value (Rsrr) of the rear roll rigidity ratio, in accordance with the equations of [Rmf=Rmv·Rsrf] and [Rmr=Rmv·Rsrr], respectively. And then, the torsion force to be created at each of the front and rear stabilizer actuators FT and RT is determined on the basis of the desired values (Rsrf) and (Rsrr) of the front and rear roll rigidity ratios, respectively, to control the motor M.

Figure 21:
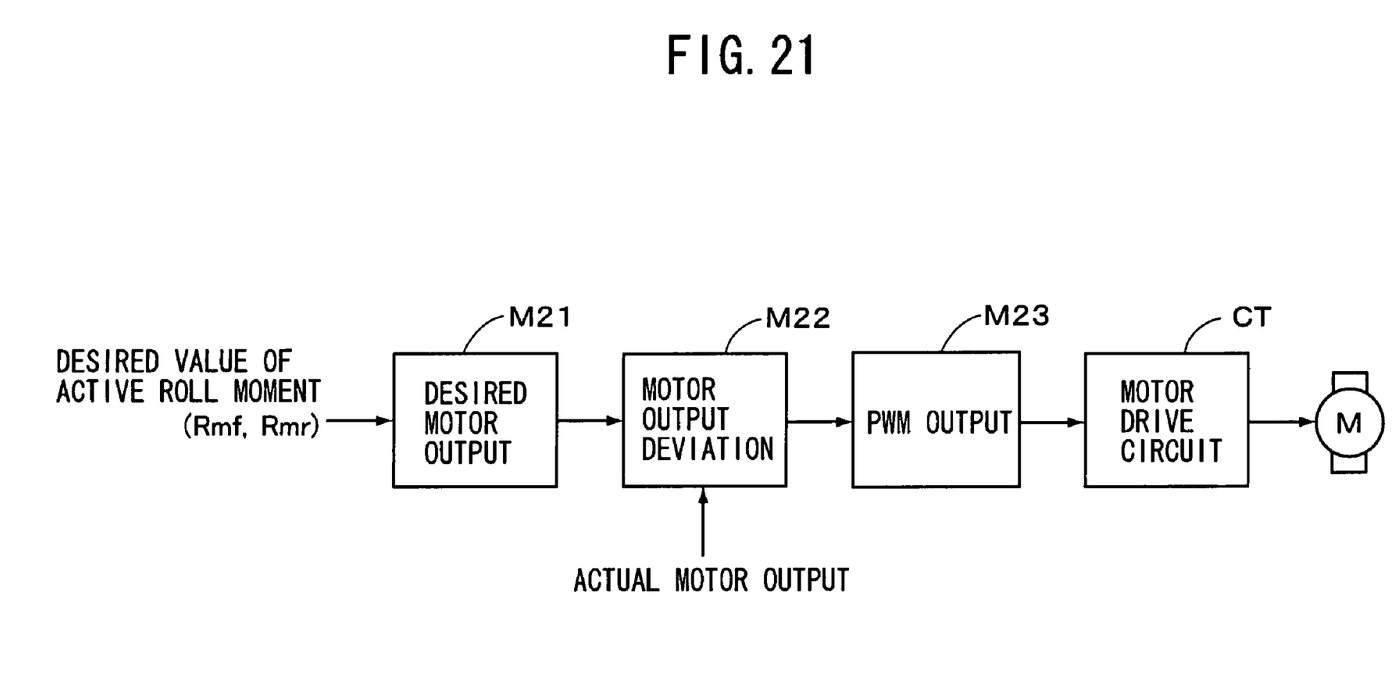
FIG. 21 is a block diagram of an example of a motor control according to an embodiment of the present invention.

Next, on the basis of the desired value (Rmf) of active roll moment for the front wheel and the desired value (Rmr) of active roll moment for the rear wheel, the desired value of the electric current fed to the motor M is set at a block M21 as shown in FIG. 21. That is, the desired value of motor output as calculated above and the actual value of motor output are compared to provide a deviation of motor output at a block M22. In response to the deviation of motor output, PWM signals fed to the motor M are determined at a block M23, and switching elements in the motor drive circuit CT are controlled by the PWM signals, to control the motor M. Control of the motor M as discussed above corresponds to an exemplary embodiment of step S60 in FIG. 22.

In order to restrain the influence caused by the rough surface of the road, a dead zone may be provided for the actual lateral acceleration (Gya). However, providing the dead zone results in decreasing a responsibility of the control system at an early stage of steering operation, so that it is inappropriate from the viewpoint of system performance. In contrast, according to the present embodiments as described above, the control gains relative to the calculated lateral acceleration (Gye) and the control gains relative to the actual lateral acceleration (Gya) are properly modified, on the basis of the information indicative of the calculated lateral acceleration obtained in response to steering operation of the vehicle driver. Consequently, it can be achieved to improve the ride comfort, restraining the influence caused by the rough surface of the road. And, if it is required to restrain the rolling motion actively, the control for restraining the rolling motion can be achieved, ensuring its responsibility.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A stabilizer control apparatus for controlling a torsional rigidity of a stabilizer disposed between a right wheel and a left wheel of a vehicle to control a rolling motion of a vehicle body actively in response to turning operation of said vehicle, comprising:
   actual lateral acceleration obtaining means for obtaining an information indicative of actual lateral acceleration of said vehicle;
   calculated lateral acceleration obtaining means for obtaining an information indicative of calculated lateral acceleration of said vehicle, in response to steering operation of said vehicle; and
   control target setting means providing a first control gain for the actual lateral acceleration obtained by the actual lateral acceleration obtaining means and a second control gain for the calculated lateral acceleration obtained by the calculated lateral acceleration obtaining means, said control target setting means setting a control target on the basis of a first product of the actual lateral acceleration multiplied by the first control gain and a second product of the calculated lateral acceleration multiplied by the second control gain, said control target setting means setting the first control gain to be zero when said vehicle is moving straight to set an influence amount of the actual lateral acceleration to the control target to zero, and said control target setting means setting the first control gain to be increased with the turning operation of said vehicle being increased; and
   control means for actively controlling the rolling motion of said vehicle body by controlling the torsional rigidity of said stabilizer on the basis of the control target set by said control target setting means.

2. A stabilizer control apparatus as set forth in claim 1, further comprising vehicle speed detection means for detecting a speed of said vehicle and steering angle detection means for detecting a steering angle provided in response to operation of a steering wheel of said vehicle, and wherein said lateral acceleration calculation means obtains the calculated lateral acceleration on the basis of the vehicle speed detected by said vehicle speed detection means and the steering angle detected by said steering angle detection means.

3. A stabilizer control apparatus as set forth in claim 1, further comprising turning factor setting means for setting a turning factor indicative of the turning operation of said vehicle and wherein said control target setting means sets the first and second control gains on the basis of the turning factor set by said turning factor setting means and said control target setting means sets the first control gain to be zero when the turning factor is zero to set the influence amount of the actual lateral acceleration to the control target to zero, and said control target setting means sets the first control gain to be increased with the turning factor being increased.

4. A stabilizer control apparatus as set forth in claim 3, further comprising yaw rate detection means for detecting a yaw rate of said vehicle, wherein said turning factor setting means is adapted to set the turning factor on the basis of at least one of the yaw rate detected by said yaw rate detection means, the calculated lateral acceleration obtained by said lateral acceleration calculation means, the actual lateral acceleration detected by said actual lateral acceleration detection means, and the steering angle detected by said steering angle detection means.

5. A stabilizer control apparatus as set forth in claim 1, wherein said control target setting means sets a desired value of vehicle active roll moment as the control target.

6. A stabilizer control apparatus as set forth in claim 1, wherein said control target setting means sets the control target on the basis of the calculated lateral acceleration obtained by said lateral acceleration calculation means, a variation of calculated lateral acceleration obtained by differentiating the calculated lateral acceleration, the actual lateral acceleration detected by said actual lateral acceleration detection means, a variation of actual lateral acceleration obtained by differentiating the actual lateral acceleration, and the first and second control gains.

7. A stabilizer control apparatus as set forth in claim 1, further comprising rough road determination means for determining whether said vehicle is running on a rough road, wherein said control target setting means modifies the second control gain relative to the calculated lateral acceleration to be increased, when said rough road determination means determines that said vehicle is running on the rough road.

8. A stabilizer control apparatus as set forth in claim 1, further comprising rough road determination means for determining whether said vehicle is running on a rough road, wherein said control target setting means modifies the first control gain relative to the actual lateral acceleration to be decreased, when said rough road determination means determines that said vehicle is running on the rough road.

9. A stabilizer control apparatus as set forth in claim 1, further comprising coefficient of friction estimation means for estimating a coefficient of friction of a road surface on which said vehicle is running, and upper limit determination means for determining an upper limit of the calculated lateral acceleration on the basis of the coefficient of friction estimated by said coefficient of friction estimation means, wherein said control target setting means modifies the calculated lateral acceleration to be the upper limit, when the calculated lateral acceleration is equal to or larger than the upper limit determined by said upper limit determination means.

* * * * *